F. G. VETTERCKE.
Dyeing Compound.
No. 9,890. Patented July 26, 1853.
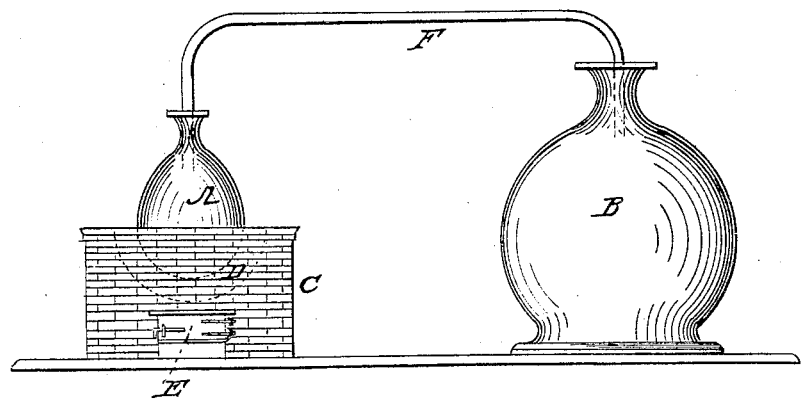

UNITED STATES PATENT OFFICE.

FREDERICK G. VETTERCKE, OF NEW YORK, N. Y.

DYEING COMPOUND.

Specification of Letters Patent No. 9,890, dated July 26, 1853.

*To all whom it may concern:*

Be it known that I, FREDERICK G. VETTERCKE, of the city, county, and State of New York, have invented a new and useful compound to produce a liquor for coloring kali blue of a great variety of shades in the same kettle of liquor by making trifling additions or by changing the degrees of heat, or both.

To make this liquor or coloring matter, I prepare a common earthen retort A and receiver B as shown in Figure 1 in the accompanying drawings (or any of the ordinary modes) properly set in a common sand bath as shown at D. This retort is connected to the receiver B by a lead pipe F, when all is ready for use. I then mix in any convenient vessel suitable for that purpose ten pounds of vitriolic acid with four pounds of cold water, and let it stand six hours. I then put in the receiver B four pounds of the prussiates of potash and three gallons boiling water, and in the retort A five pounds of manganese and four pounds of common salt, and the mixture of vitriol and water previously prepared, and then put on the pipe F and lute it air-tight to the mouth of the receiver and the retort, let the whole stand in this way for six hours. I then kindle a slow fire and keep it up six hours longer, during which time the chlorid formed in the retort A will pass over to the receiver B. I then take off the lead-pipe F and close up the receiver B air tight and the compound is ready for use. To use the compound I then take the same retort A and receiver B or others prepared in the same way, prepare a mixture of vitriol and water, same as used in making the "kali compound" for the retort A and managed the same throughout, but in the receiver B I put eight pounds of the salts of tin and two pounds tartaric acid and three gallons boiling water, the whole then to be worked same as making the "kali compound" (six hours without fire and six hours with fire) this last operation produces "chlorid of tin."

Thus it will be seen, that I have now obtained two compounds to be used as coloring ingredients with these and others in common use. I prepare a dye of sufficient quantity for about thirty pounds wool (or yarn) in the following manner: To six pounds of the "kali compound" add two pounds of vitriolic acid, mix the whole with about one hundred gallons of water in a common dyer's kettle, heat the whole up to 212° F. put in the wool and let it remain three fourths of an hour. I then have a green or ground color, add to the same kettle of dye three pounds of "kali compound" and two pounds of vitriol and heat to 200° F. put in the wool and let remain as before for three fourths of an hour. Thus an endless variety of shades may be produced by slight changes of the proportions of the ingredients and the degrees of heat. This process makes the wool soft and smooth and the colors perfectly fast and can be produced for one half the cost of these colors when done in the usual way.

Having thus fully described my invention and the manner of working the same what I claim herein as new and desire to secure by Letters Patent is—

The making of the kali compound substantially as herein set forth as a basis for a blue dye.

F. G. VETTERCKE.

Witnesses:
    JOHN H. MILLER,
    JACOB VORAEEN.